United States Patent
Kiyono et al.

(10) Patent No.: US 10,060,517 B2
(45) Date of Patent: Aug. 28, 2018

(54) STRAIN WAVE GEARING, FRICTIONAL ENGAGEMENT WAVE DEVICE, AND WAVE GENERATOR

(71) Applicant: HARMONIC DRIVE SYSTEMS INC., Shinagawa-ku, Tokyo (JP)

(72) Inventors: Satoshi Kiyono, Sendai (JP); Tatsuro Hoshina, Azumino (JP); Masakatsu Sasahara, Azumino (JP)

(73) Assignee: HARMONIC DRIVE SYSTEMS INC., Shinagawa-Ku, Tokyo (JP)

( * ) Notice: Subject to any disclaimer, the term of this patent is extended or adjusted under 35 U.S.C. 154(b) by 587 days.

(21) Appl. No.: 14/758,451

(22) PCT Filed: Nov. 19, 2013

(86) PCT No.: PCT/JP2013/081201
§ 371 (c)(1),
(2) Date: Jun. 29, 2015

(87) PCT Pub. No.: WO2015/075781
PCT Pub. Date: May 28, 2015

(65) Prior Publication Data
US 2016/0298746 A1  Oct. 13, 2016

(51) Int. Cl.
*F16H 49/00* (2006.01)
(52) U.S. Cl.
CPC ..... *F16H 49/001* (2013.01); *F16H 2049/003* (2013.01)
(58) Field of Classification Search
CPC .................................................. F16H 49/001
(Continued)

(56) References Cited

U.S. PATENT DOCUMENTS 4,491,033 A * 1/1985 Carlson ................ F16H 49/001
74/640
4,974,470 A * 12/1990 Ishikawa ............... F16H 49/001
74/640

(Continued)

FOREIGN PATENT DOCUMENTS

CH       613 261 A5    9/1979
JP       59-190541 A  10/1984
(Continued)

OTHER PUBLICATIONS

International Search Report (PCT/ISA/210) dated Feb. 18, 2014, by the Japanese Patent Office as the International Searching Authority for International Application No. PCT/JP2013/075729PCT/JP2013/081201.

*Primary Examiner* — William C Joyce
(74) *Attorney, Agent, or Firm* — Buchanan Ingersoll & Rooney PC

(57) ABSTRACT

An externally toothed gear of a strain wave gearing is made to flex into a shape conforming to an ellipsoidal curve. The externally toothed gear meshes with an internally toothed gear at the major-diameter position of the ellipsoidal curve. These two meshing positions gradually change in the circumferential direction of the both gears along the tooth trace direction. The number of external teeth of the externally toothed gear participating in meshing with the internally toothed gear can be increased. A strain wave gearing which has a high rigidity and is capable of reducing vibrational noise, can be realized.

9 Claims, 6 Drawing Sheets

(58) Field of Classification Search
    USPC .......................................................... 74/640
    See application file for complete search history.

(56)                References Cited

U.S. PATENT DOCUMENTS

2004/0025629 A1*  2/2004  Poehlau ................ F16H 49/001
                                                          74/640
2009/0260469 A1   10/2009  Kanai
2013/0247716 A1*  9/2013  Takahashi ............. F16H 49/001
                                                          74/640

FOREIGN PATENT DOCUMENTS

| JP | 01-122543   A  | 8/1989  |
|----|----------------|---------|
| JP | 06-241285   A  | 8/1994  |
| JP | 2007-071242 A  | 3/2007  |
| JP | 4067037     B2 | 1/2008  |
| JP | 2009-156462 A  | 7/2009  |
| JP | 2009-257510 A  | 11/2009 |
| JP | 2012-072912 A  | 4/2012  |
| JP | 2013-015191 A  | 1/2013  |
| JP | 2013-194836 A  | 9/2013  |

* cited by examiner

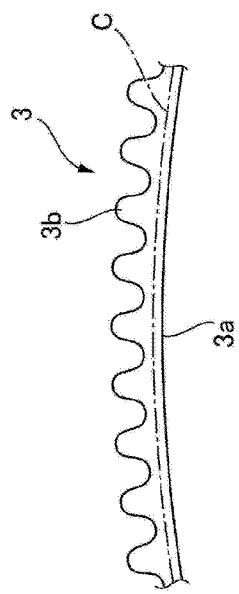
FIG. 2(A1)
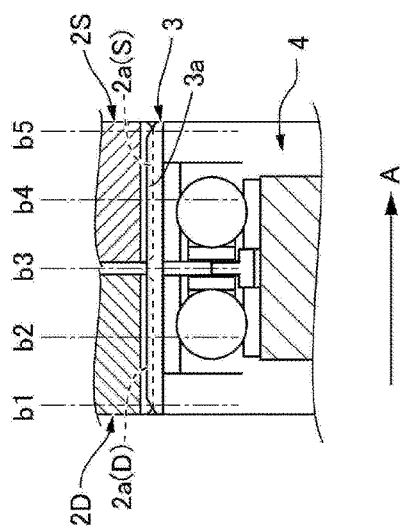
FIG. 2(A2)
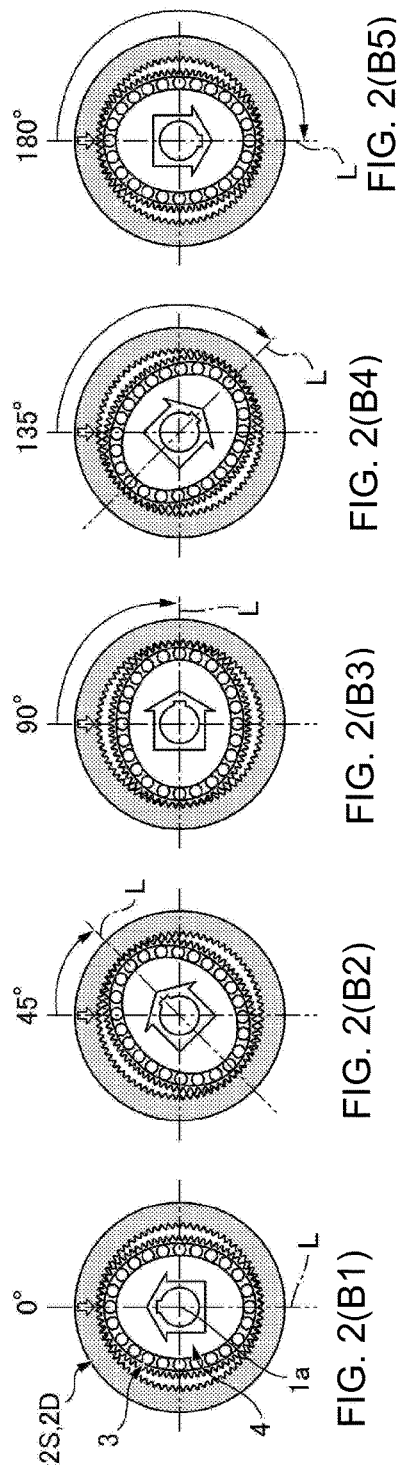
FIG. 2(B1)
FIG. 2(B2)
FIG. 2(B3)
FIG. 2(B4)
FIG. 2(B5)

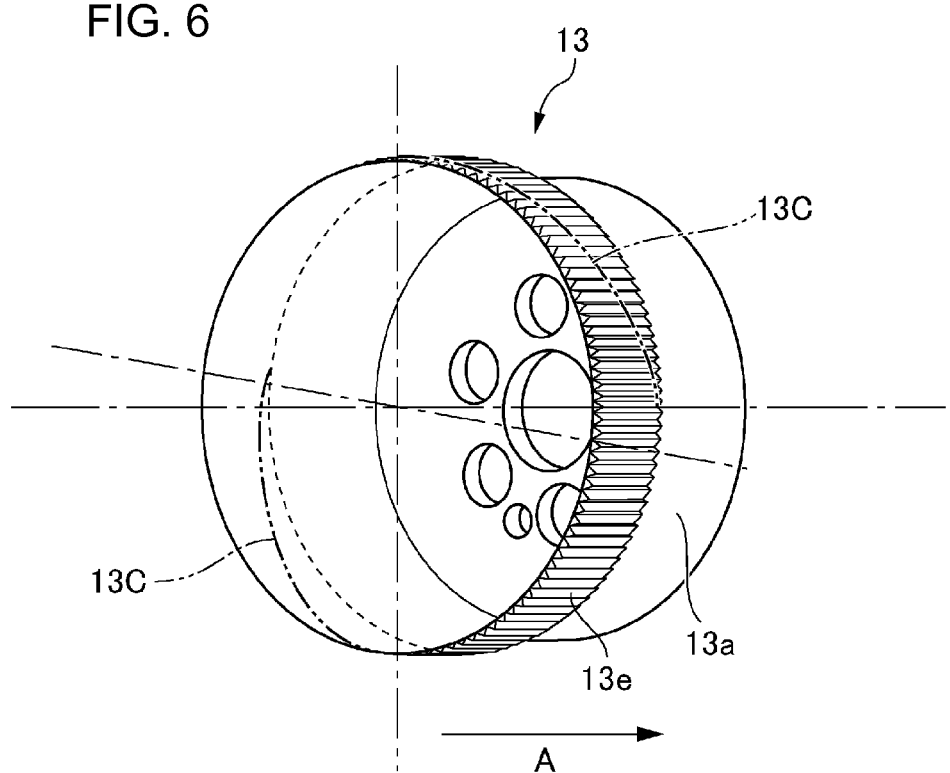

STRAIN WAVE GEARING, FRICTIONAL ENGAGEMENT WAVE DEVICE, AND WAVE GENERATOR

TECHNICAL FIELD

The present invention relates to a strain wave gearing in which there is a large number of teeth in a flexible gear simultaneously meshing with a rigid gear, and a frictional engagement wave device in which the portions where the frictional engagement surface of a flexible member engages with the frictional engagement surface of a rigid member are long. The present invention also relates to a wave generator used in order to flex a flexible gear or a flexible member.

BACKGROUND ART

A strain wave gearing is configured from a rigid internally toothed gear, an externally toothed gear having flexibility (elastic deformability), and a wave generator, and is free of the backlash that occurs in normal gears and is able to achieve a large reduction ratio in one stage.

Known examples of typical strain wave gearings include the cup-shaped strain wave gearing comprising a cup-shaped externally toothed gear disclosed in Patent Document 1, the top-hat-shaped strain wave gearing comprising a top-hat-shaped externally toothed gear disclosed in Patent Document 2, and the flat strain wave gearing comprising a cylindrical externally toothed gear disclosed in Patent Document 3.

In a strain wave gearing, the externally toothed gear is made to flex into a non-circular shape, typically an ellipsoidal shape, by the wave generator, and is meshed with the internally toothed gear in two locations of the major-axis direction of the ellipsoidal shape. When the wave generator is rotated by a motor or the like, the meshing positions of the two gears move in the circumferential direction, and relative rotation occurs between the two gears, the rotation corresponding to the difference in the number of teeth of the two gears. Fixing one gear in place makes it possible to acquire reduced rotational output from the other gear. Patent Document 4 proposes a shape for a wave generator that causes an externally toothed gear to flex.

Another example of a strain wave gearing is one in which a flexible internally toothed gear is disposed on the external peripheral side of a rigid externally toothed gear, and a wave generator is disposed on the external peripheral side of the internally toothed gear.

Also known are the frictional engagement wave devices proposed in Patent Documents 5 and 6. A frictional engagement wave device comprises a rigid member having a circular frictional engagement internal peripheral surface, a flexible member having a circular frictional engagement external peripheral surface disposed on the inner side of the rigid member, and a wave generator disposed on the inner side of the flexible member. When the flexible member is made to flex into a non-circular shape, e.g., an ellipsoidal shape, by the wave generator, the circular frictional engagement external peripheral surface flexes into an ellipsoidal shape. This results in a state in which the portions equivalent to major-diameter positions in the frictional engagement external peripheral surface are in frictional engagement with the circular frictional engagement internal peripheral surface of the rigid member.

When the wave generator is rotated, the frictional engagement positions of the two members move in the circumferential direction. The peripheral length of the frictional engagement external peripheral surface is shorter than that of the frictional engagement internal peripheral surface by a predetermined amount. Consequently, when the wave generator makes one rotation, relative rotation proportional to the peripheral lengths occurs between the two members. Fixing one member in place so as to not rotate makes it possible to acquire reduced rotation from the other member.

Frictional engagement wave devices are also known to have configurations in which a flexible member is disposed on the outer side of a rigid member, and the flexible member is made to flex and mesh with the rigid member by a wave generator disposed on the outer side of the flexible member.

PRIOR ART DOCUMENTS

Patent Documents

[Patent Document 1] JP-A 2012-072912
[Patent Document 2] JP-A 2009-257510
[Patent Document 3] JP-A 2009-156462
[Patent Document 4] JP 4067037
[Patent Document 5] JP-A 2007-71242
[Patent Document 6] JP-A H06-241285

DISCLOSURE OF THE INVENTION

Problems to be Solved by the Invention

Because the strain wave gearing herein comprises an externally toothed gear or an internally toothed gear that must be elastically deformable, there are more cases of holding rigidity being insufficient than when rigid gears are meshed together. There are also no countermeasures for further reducing vibrational noise originating in an externally toothed gear or an internally toothed gear which rotates while repeatedly elastically deforming. Therefore, depending on the application, there are also cases in which vibrational noise is an impediment and the strain wave gearing cannot be used.

In the case of a frictional engagement wave device, rigidity is low because there are few frictional engagement portions. It is preferred that the frictional engagement portions can be lengthened.

In view of such matters, the present invention addresses the problem of providing a strain wave gearing and a frictional engagement wave device that have high rigidity and that are capable of reducing vibrational noise, as well as a wave generator used in this strain wave gearing and wave device.

Means Used to Solve the Problems

To solve the problem described above, in the strain wave gearing of the present invention, rigidity is increased by increasing the number of teeth of the externally toothed gear that participate in the meshing with the internally toothed gear. Specifically, the externally toothed gear is made to flex so that the positions where the externally toothed gear meshes with the internally toothed gear gradually change in the circumferential direction, along the tooth trace direction of the externally toothed gear. The external peripheral surface shape of the wave generator for making the externally toothed gear flex is set to an appropriate shape so that such a meshing state between the two gears can be formed.

Specifically, the strain wave gearing of the present invention is characterized in comprising:

a rigid internally toothed gear, a flexible externally toothed gear, and a wave generator for causing the externally toothed gear to flex into a non-circular shape and mesh with the internally toothed gear;

the meshing positions between the externally toothed gear and the internally toothed gear being multiple positions separated in the circumferential direction of the gears in axially perpendicular cross-sections in the tooth trace direction in the externally toothed gear; and each of the meshing positions gradually changing in the circumferential direction when viewed along the tooth trace direction.

The wave generator typically causes the externally toothed gear to flex into a shape conforming to an ellipsoidal curve. The meshing positions of the two gears in this case are the major-diameter positions of the ellipsoidal curve.

In conventional practice, the externally toothed gear is made to flex into the form of ellipsoidal curves of the same phase in axially perpendicular cross-sections in the tooth trace direction, and the major-diameter positions of the ellipsoidal curves are the same in each cross-section. The positions where the two gears mesh are the two positions on the major diameter of the ellipsoidal curve, which are the same positions in each axially perpendicular tooth-trace-direction cross-section.

In the present invention, the externally toothed gear is made to flex into a shape conforming to an ellipsoidal curve in axially perpendicular tooth-trace-direction cross-sections, but the ellipsoidal curve in each cross-section has a different phase about the center axis, and the major-diameter positions are in different positions in the circumferential direction. In other words, the externally toothed gear meshes with the internally toothed gear at different positions in the circumferential direction in each tooth-trace-direction cross-section. Therefore, the externally toothed gear has a large number of teeth participating in the meshing with the internally toothed gear. Consequently, the rigidity of the strain wave gearing can be increased, and ratcheting torque and transmitted torque can be increased.

In conventional practice, each part of the externally toothed gear in the tooth trace direction is repeatedly made to flex in the radial direction at the same phase. In the present invention, each part of the externally toothed gear in the tooth trace direction is repeatedly made to flex in the radial direction at different phases. Therefore, vibrational noise originating from the elastic deformation of the externally toothed gear can be reduced.

In the present invention, the externally toothed gear is made to flex so that from one end to the other in the tooth-trace direction, the major-diameter positions gradually change in one direction about the center of the ellipsoidal curve.

For example, the externally toothed gear is made to flex so that between one end to the other in the tooth-trace direction, the major-diameter positions change within an angular range of 180 degrees or less about the center. When the major-diameter positions change by 180 degrees, substantially all of the external teeth of the externally toothed gear participate in the meshing with the internally toothed gear. This is advantageous in increasing meshing rigidity.

There are also cases in which the externally toothed gear is made to flex so that from one end to the other in the tooth-trace direction the major-diameter positions gradually change about the center in the opposite direction after having gradually changed in the first direction.

For example, the externally toothed gear is made to flex so that from one end to the other in the tooth trace direction the major-diameter positions change about the center by angles of 90 degrees or less in the opposite direction after having changed by 90 degrees or less in the first direction.

With such a configuration, axial thrust acting on the two gears acts in opposite directions on the left and right, centered about the middle position of the tooth trace direction. Therefore, the left and right axial thrust forces cancel each other out. If axial thrust force is created in left-and-right symmetry, there is no need for a bearing for receiving thrust force.

In the present invention, when the externally toothed gear is a cup-shaped or top-hat-shaped externally toothed gear comprising a cylindrical barrel part, a diaphragm extending in the radial direction from one end of the cylindrical barrel part, and external teeth formed in the external peripheral surface in the region at the other end of the cylindrical barrel part, the wave generator causes an external-teeth-forming portion, where the external teeth are formed in the cylindrical barrel part, to flex into a shape conforming to the ellipsoidal curve.

Next, the present invention can be applied to a strain wave gearing in which a flexible internally toothed gear is disposed on the external peripheral side of a rigid externally toothed gear. The strain wave gearing of the present invention is characterized in comprising:

a rigid externally toothed gear, a flexible internally toothed gear, and a wave generator for causing the internally toothed gear to flex into a shape conforming to an ellipsoidal curve and mesh with the externally toothed gear;

the meshing positions between the internally toothed gear and the externally toothed gear being the major-diameter positions of the ellipsoidal curve in axially perpendicular tooth-trace-direction cross-sections in the internally toothed gear; and each of the meshing positions gradually changing in the circumferential direction when viewed along the tooth trace direction of the internally toothed gear.

There are cases in which the internally toothed gear is made to flex so that from one end to the other in the tooth trace direction, the major-diameter positions gradually change in one direction about the center of the ellipsoidal curve C. For example, the internally toothed gear is made to flex so that between one end to the other in the tooth trace direction, the major-diameter positions change within an angular range of 180 degrees or less about the center.

There are also cases in which the internally toothed gear is made to flex so that from one end to the other in the tooth-trace direction, the major-diameter positions gradually change about the center in the opposite direction after having gradually changed in the first direction. For example, the internally toothed gear is made to flex so that the major-diameter positions are at the same rotational positions at one end and the other end in the tooth-trace direction, and in a middle position between these ends, the major-diameter positions are rotated by an angle of 90 degrees or less about the center from the rotational positions.

The present invention can also be applied to a frictional engagement wave device. The frictional engagement wave device of the present invention is characterized in comprising:

a rigid member having a circular frictional engagement internal peripheral surface;

a flexible member having a circular frictional engagement external peripheral surface; and a wave generator for causing the frictional engagement external peripheral surface of the flexible member to flex into a shape conforming to an ellipsoidal curve and frictionally engage with the frictional engagement internal peripheral surface of the rigid member;

the frictional engagement positions of the frictional engagement external peripheral surface and the frictional engagement internal peripheral surface being the major-diameter positions of the ellipsoidal curve in axially perpendicular cross-sections in the direction of a device center axis in the frictional engagement external peripheral surface; and each of the frictional engagement positions gradually changing in the circumferential direction of the frictional engagement external peripheral surface when viewed along the device center axis.

Similarly, the present invention can also be applied to a wave device in which a flexible member is disposed on the external peripheral side of a rigid member. The frictional engagement wave device in this case is characterized in comprising:

a flexible member having a circular frictional engagement internal peripheral surface;

a rigid member having a circular frictional engagement external peripheral surface; and a wave generator for causing the frictional engagement internal peripheral surface of the flexible member to flex into a shape conforming to an ellipsoidal curve and frictionally engage with the frictional engagement external peripheral surface of the rigid member;

the frictional engagement positions of the frictional engagement internal peripheral surface and the frictional engagement external peripheral surface being the major-diameter positions of the ellipsoidal curve in axially perpendicular cross-sections in the direction of a device center axis in the frictional engagement internal peripheral surface; and each of the frictional engagement positions gradually changing in the circumferential direction of the frictional engagement internal peripheral surface when viewed along the device center axis.

In these frictional engagement wave devices, the flexible member is made to flex so that from one end to the other in the center-axis direction, the major-diameter positions gradually change in one direction about the center of the ellipsoidal curve. For example, the flexible member is made to flex so that between one end and the other in the device center axis direction, the major-diameter positions change within an angular range of 180 degrees or less about the center.

Alternatively, the flexible member is also made to flex so that from one end to the other in the center-axis direction, the major-diameter positions gradually change in the opposite direction about the center after having gradually changed in the first direction. For example, the flexible member is made to flex so that the major-diameter positions are in the same rotational positions in one end and the other end of the device center axis direction, and in a middle position between these ends, the major-diameter positions are rotated by an angle of 90 degrees or less about the center from the rotational positions.

Next, the wave generator of the present invention is characterized in comprising:

an ellipsoidal peripheral surface for causing a flexible member to flex into an ellipsoidal shape, the flexible member having either a flexible externally toothed gear or flexible internally toothed gear in a strain wave gearing, or a frictional engagement external peripheral surface or frictional engagement internal peripheral surface in a frictional engagement wave device;

the ellipsoidal peripheral surface being defined by an ellipsoidal curve in which a profile shape, seen when the ellipsoidal peripheral surface is sectioned by a plane orthogonal to a center axis at different positions in the center axis direction, is centered about the center axis;

the ellipsoidal peripheral surface having a peripheral surface portion of at least a predetermined width in the center axis direction; and the major-diameter positions of the ellipsoidal curve in the peripheral surface portion gradually changing about the center axis along the center axis direction.

For example, the major-diameter positions of the ellipsoidal curve in the peripheral surface portion change within an angular range of 180 degrees or less about the center axis, between one end to the other in the center axis direction of the peripheral surface portion.

Alternatively, the major-diameter positions of the ellipsoidal curve in the peripheral surface portion, after having gradually changed in one direction about the center axis, gradually change in the opposite direction along the center axis direction. In this case, for example, the major-diameter positions of the ellipsoidal curve in the peripheral surface portion are in the same rotational positions at one end and the other end of the center axis direction in the peripheral surface portion, and, in a middle position between these ends, the major-diameter positions are rotated by angles of 90 degrees or less from the rotational positions.

For example, in a cup-shaped externally toothed gear or a top-hat-shaped externally toothed gear, external teeth are formed in the external peripheral surface on the opening-end-side, and the amount of flexure increases in the radial direction substantially proportionate to the distance from the diaphragm side. It is preferable that the length of the major diameter of the ellipsoidal external peripheral surface of the wave generator be changed so as to correspond with such a change in the amount of flexure in the tooth trace direction. Specifically, it is preferable that the major-diameter dimension of the ellipsoidal curve gradually decrease from one end toward the other of the ellipsoidal peripheral surface, along the center axis direction.

A typical wave generator comprises:

a rigid wave generator plug having the ellipsoidal peripheral surface; and a wave generator rolling bearing fitted in the external peripheral surface or internal peripheral surface of the wave generator plug;

the wave generator rolling bearing having a flexible outer race and a flexible inner race; and the outer race or the inner race of the wave generator rolling bearing being made to flex into an ellipsoidal shape by the ellipsoidal peripheral surface.

There are known forms of wave generators in which magnetic force or a piezoelectric effect is used to cause either a flexible externally toothed gear, a flexible internally toothed gear, or a flexible member having a frictional engagement internal peripheral surface or a frictional engagement external peripheral surface, to flex into an ellipsoidal shape. A wave generator of such a form can be used to cause a flexible externally toothed gear, a flexible internally toothed gear, or a flexible member having a frictional engagement internal peripheral surface or a frictional engagement external peripheral surface, to flex in the manner described above.

BRIEF DESCRIPTION OF THE DRAWINGS

FIGS. 2(A1), 2(A2) and 2(B1)-2(B5) include explanatory drawings showing, inter alia, meshed states in the tooth trace direction of the flat strain wave gearing.

FIG. 6 is an explanatory drawing showing the meshing positions of an externally toothed gear of the cup-shaped strain wave gearing.

MODE FOR CARRYING OUT THE INVENTION

An embodiment of a strain wave gearing unit to which the present invention is applied is described below with reference to the drawings.

Embodiment 1

Figure 1A:
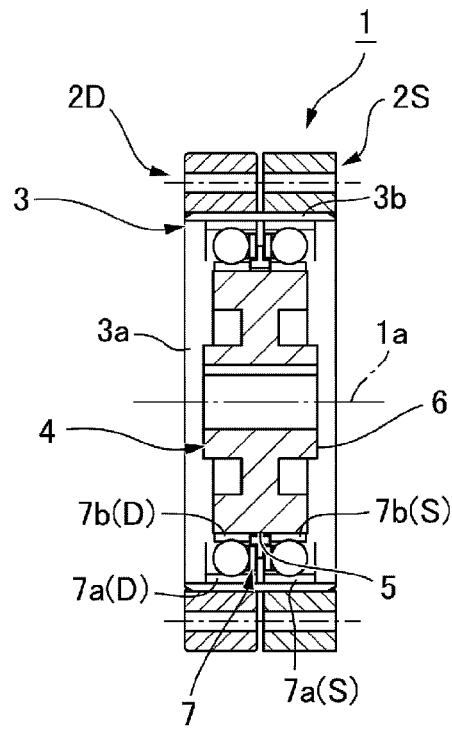
FIG. 1(A) and FIG. 1(B) include explanatory drawings showing a flat strain wave gearing to which the present invention is applied.
Figure 1B:
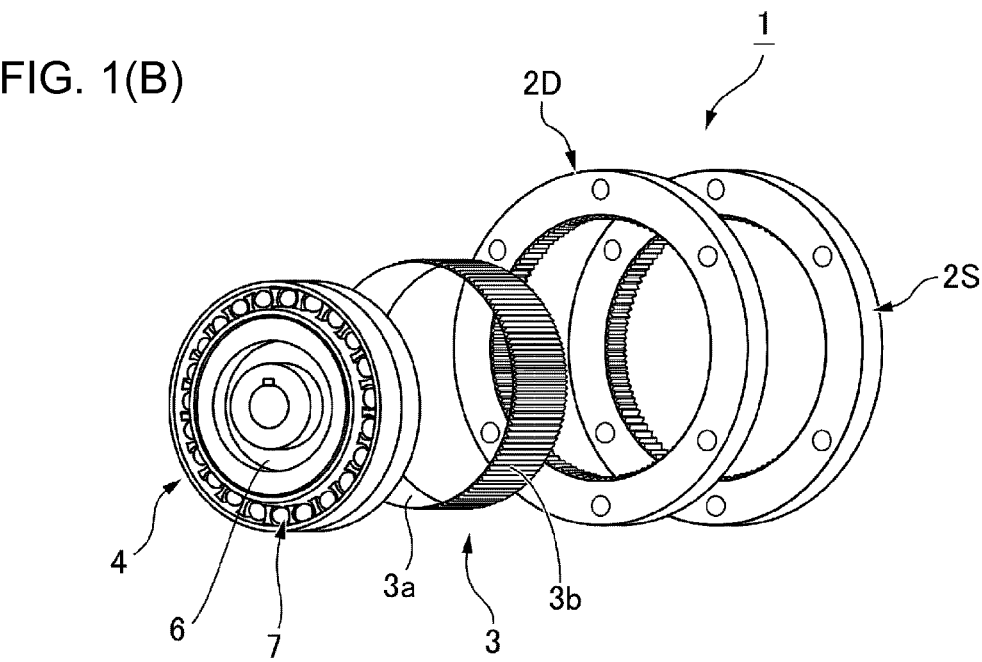

FIGS. 1(A) and 1(B) are a longitudinal cross-sectional view and an exploded perspective view showing a flat strain wave gearing to which the present invention is applied.

In a flat strain wave gearing 1, one flexible externally toothed gear 3 is disposed on the inner sides of two rigid internally toothed gears, i.e., an internally toothed gear 2S and an internally toothed gear 2D. The externally toothed gear 3 has a simple shape provided with a cylindrical barrel part 3a capable of flexing in the radial direction, and external teeth 3b formed in the circular external peripheral surface of this cylindrical barrel part 3a.

The externally toothed gear 3 is made to flex into an ellipsoidal shape and partially mesh with the internally toothed gears 2S, 2D by a wave generator 4 having an ellipsoidal profile and fitted to the inner side of the externally toothed gear. When the wave generator 4 is rotated, the meshing positions between the externally toothed gear 3 and the two internally toothed gears 2S, 2D move in the circumferential direction.

The number of teeth of one internally toothed gear 2D is the same as the externally toothed gear 3, and the number of teeth of the other internally toothed gear 2S is greater than the externally toothed gear 3, commonly by 2n (n being a positive integer). Therefore, the externally toothed gear 3 rotates integrally with the internally toothed gear 2D which has the same number of teeth, and relative rotation, corresponding to the difference in the number of teeth of the two gears, occurs with the internally toothed gear 2S which has a different number of teeth. The one internally toothed gear 2S is fixed so as to not rotate, whereby reduced rotation is outputted from the other internally toothed gear 2D.

The wave generator 4 is configured from a rigid plug 6 which has a uniform width and which is provided with an ellipsoidal external peripheral surface 5, and a pair of wave generator bearings 7 fitted on the ellipsoidal external peripheral surface 5 of the plug 6. The wave generator bearings 7 are provided with outer races 7a(S), 7a(D) and inner races 7b(S), 7b(D) capable of flexing in the radial direction, and are fitted between the plug 6 and the externally toothed gear 3. The wave generator bearings 7 as a whole are made to flex into ellipsoidal shapes conforming to the ellipsoidal external peripheral surface 5 of the plug 6. Consequently, the externally toothed gear 3 is also made to flex into an ellipsoidal shape conforming to the ellipsoidal external peripheral surface 5 of the plug 6, and the external teeth at the major-diameter positions thereof mesh with the internal teeth of the internally toothed gears 2S, 2D. In the present example, the profile shape of the ellipsoidal external peripheral surface 5 of the plug 6 of the wave generator 4 is appropriately set so that the flexed state of the externally toothed gear 3 described below is formed.

FIGS. 2 (A1), 2(A2) and 2(B1)-2(B5) include explanatory drawings showing meshed states of the internally toothed gears 2 and the externally toothed gear 3 in axially perpendicular cross-sections, at different positions in the tooth trace direction. In FIG. 2, (A1) shows different positions in the tooth trace direction, 2(A2) is a partial enlarged cross-sectional view of the externally toothed gear 3, and FIGS. 2(B1) to 2(B5) show axially perpendicular cross-sections of the externally toothed gear 3 at different positions b1 to b5 in the tooth trace direction.

The externally toothed gear 3 is made to flex into an ellipsoidal shape by the wave generator 4 in the axially perpendicular cross-sections at positions b1 to b5 of the tooth trace direction A. Specifically, the externally toothed gear is made to flex so that a rim neutral circle of the root of the externally toothed gear 3 is an ellipsoidal curve C. The externally toothed gear 3 is also made to flex so that the major-diameter positions L of the ellipsoidal curve C in the axially perpendicular cross-sections at positions b1 to b5 in the tooth trace direction A change along the tooth trace direction A, around a rotational center axis 1a of the device (around the center of the ellipsoidal curve C). The externally toothed gear 3 made to flex in this manner meshes with the internal teeth 2a(S), 2a(D) of the internally toothed gears 2S, 2D in the major-diameter positions L of the ellipsoidal curve C in the axially perpendicular cross-sections at positions b1 to b5 in the tooth trace direction A.

In the illustrated example, the major-diameter positions L of the ellipsoidal curve C in the axially perpendicular cross-sections at positions b1 to b5 in the tooth trace direction A gradually change continuously in the same direction around the rotational center axis 1a, from the position b1 of one end to the position b5 of the other end in the tooth trace direction A. The major-diameter positions may also be gradually changed in the same direction in increments, by fixed angles over fixed distances along the tooth trace direction A. The ellipsoidal curve C at the position b2 is rotated 45 degrees clockwise from the ellipsoidal curve C of the position b1 of one end in the tooth trace direction A, the ellipsoidal curve C at the position b3 (the middle of the tooth trace direction) is rotated 90 degrees clockwise, the ellipsoidal curve C at the position b4 is rotated 135 degrees clockwise, and the ellipsoidal curve C at the position b5 is rotated 180 degrees clockwise.

Figure 3:
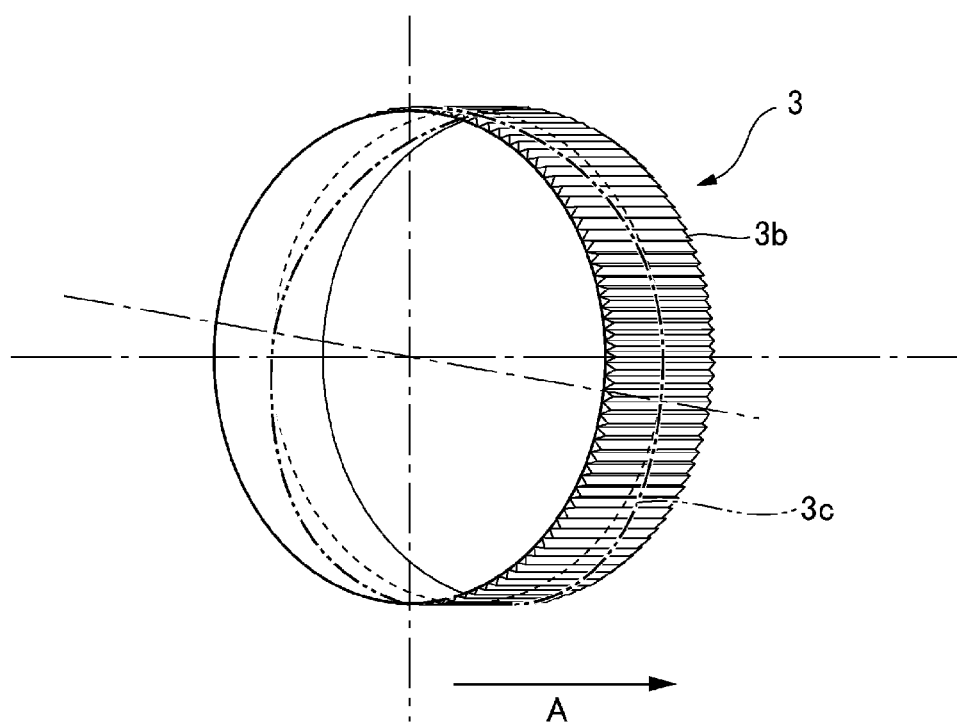
FIG. 3 is an explanatory drawing showing the meshing positions of an externally toothed gear of the flat strain wave gearing.

At the positions b1 to b5, the external teeth 3b of the externally toothed gear 3 mesh with the internal teeth 2a(S), 2a(D) of the internally toothed gears 2S, 2D in the major-diameter positions L of the ellipsoidal curve C. Therefore, the meshing positions of the externally toothed gear 3 with respect to the internally toothed gears 2S, 2D gradually move circumferentially in the tooth trace direction A from the position b1 of one tooth-trace-direction end. Specifically, as shown by curve 3c in FIG. 3, substantially all of the individual external teeth 3b mesh simultaneously with the internal teeth 2a(S), 2a(D) when viewed along the tooth trace direction A, although the meshing is only partial for each of the teeth.

In conventional practice, the externally toothed gear 3 is made to flex into the form of an ellipsoidal curve having the same phase throughout the entire tooth trace direction, and there are only two meshing positions with the internally toothed gears 2S, 2D in the major-diameter direction. Therefore, in comparison with conventional practice, the meshing areas of the two gears are nearly the same, but because substantially all of the external teeth 3b simultaneously participate in the meshing, it is possible to achieve a strain wave gearing 1 in which the meshing rigidity of the two gears is higher and transmission torque capacity is greater.

At different positions of the externally toothed gear 3 in the tooth trace direction A, different portions in the circumferential direction are made to flex radially outward or inward. Therefore, vibrational noise caused by elastic deformation of the externally toothed gear 3 can be better suppressed than in a conventional strain wave gearing which rotates while the same positions in the circumferential direction are made to flex radially outward or inward.

Embodiment 2

Figure 4A:
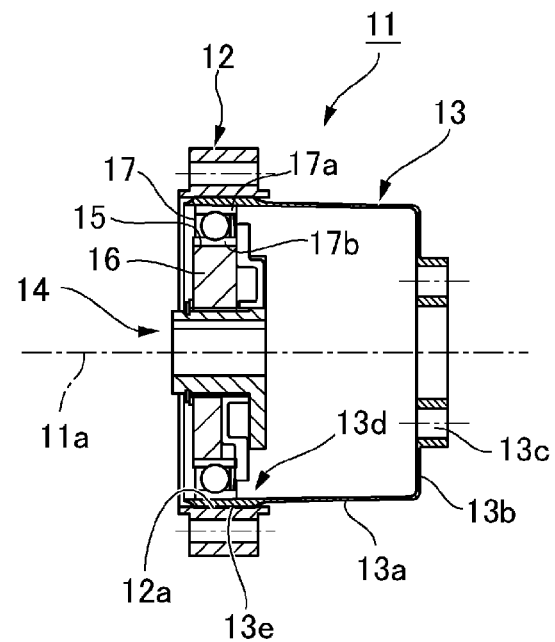
FIGS. 4(A) and 4(B) include explanatory drawings showing a cup-shaped strain wave gearing to which the present invention is applied.
Figure 4B:
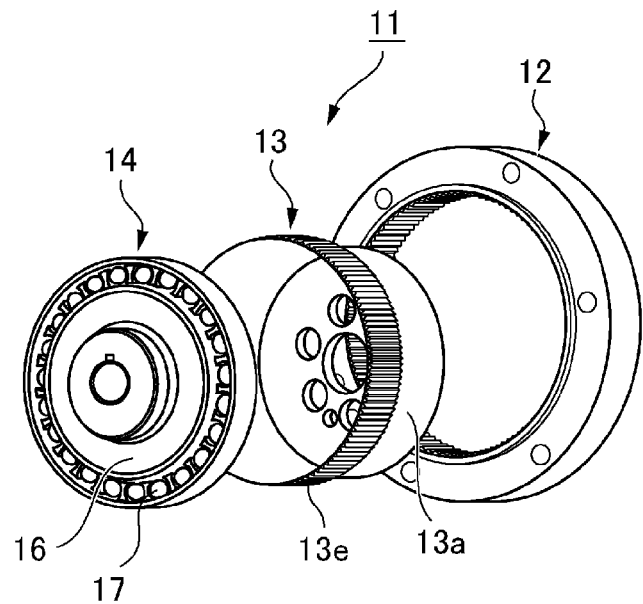

FIGS. 4(A) and 4(B) are a longitudinal cross-sectional view and an exploded perspective view showing a cup-shaped strain wave gearing to which the present invention is applied. In the cup-shaped strain wave gearing 11, an externally toothed gear 13 disposed on the inner side of a rigid internally toothed gear 12 has the shape of a cup. The externally toothed gear 13 comprises a cylindrical barrel part 13a capable of flexing in the radial direction, a diaphragm 13b extending radially inward from the rear end of the cylindrical barrel part, and a thick annular or discoid boss 13c formed as a continuation of the internal peripheral edge of the diaphragm 13b. The portion on the front-end-opening side of the cylindrical barrel part 13a is an external-teeth-forming portion 13d, and external teeth 13e are formed on the external peripheral surface portion thereof.

The cylindrical barrel part 13a of the externally toothed gear 13 is made to flex into an ellipsoidal shape by a wave generator 14 having an ellipsoidal profile and fitted to the inner side of the external-teeth-forming portion 13d, and the external teeth 13e partially mesh with internal teeth 12a of the internally toothed gear 12. When the wave generator 14 is rotated, the meshing positions of the gears 12, 13 move in the circumferential direction, and relative rotation depending on the difference in the number of teeth between the gears 12, 13 occurs between the gears. One gear is fixed so that the, e.g., internally toothed gear 12 is not caused to rotate, whereby reduced rotation is outputted from the other cup-shaped externally toothed gear 13.

The wave generator 14 comprises a rigid plug 16 of annular shape and uniform width, and a wave generator bearing 17 fitted on the ellipsoidal external peripheral surface 15 of this plug 16. The wave generator bearing 17 comprises an outer race 17a and an inner race 17b capable of flexing in the radial direction, and the wave generator bearing is fitted between the plug 16 and the externally toothed gear 13. The wave generator bearing 17 as a whole is made to flex into an ellipsoidal shape conforming to the ellipsoidal external peripheral surface 15 of the plug 16. Consequently, the externally toothed gear 13 is also made to flex into an ellipsoidal shape conforming to the ellipsoidal external peripheral surface 15 of the plug 16, and the external teeth 13e at both ends in the major-diameter positions thereof mesh with the internal teeth 12a of the internally toothed gear 12. In the present example, the profile of the ellipsoidal external peripheral surface 15 of the plug 16 of the wave generator 14 is appropriately set so as to form the flexed state of the external-teeth-forming portion 13d of the externally toothed gear 13 described below.

Figure 5:
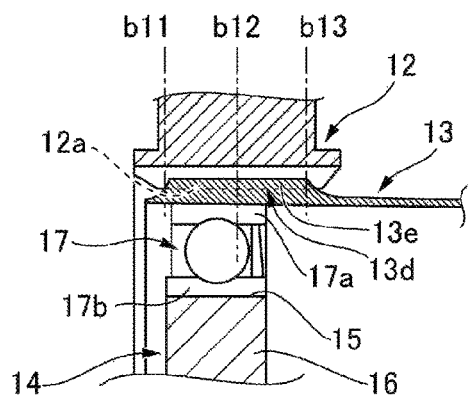
FIGS. 5(A1), 5(A2), 5(B11)-5(B13) include explanatory drawings showing meshed states and the like in the tooth trace direction of the cup-shaped strain wave gearing.
Figure 5:
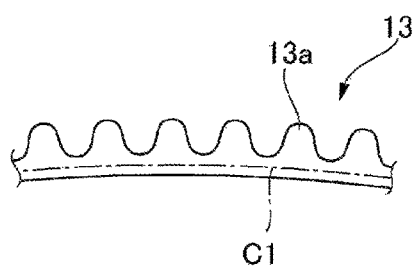
Figure 5:
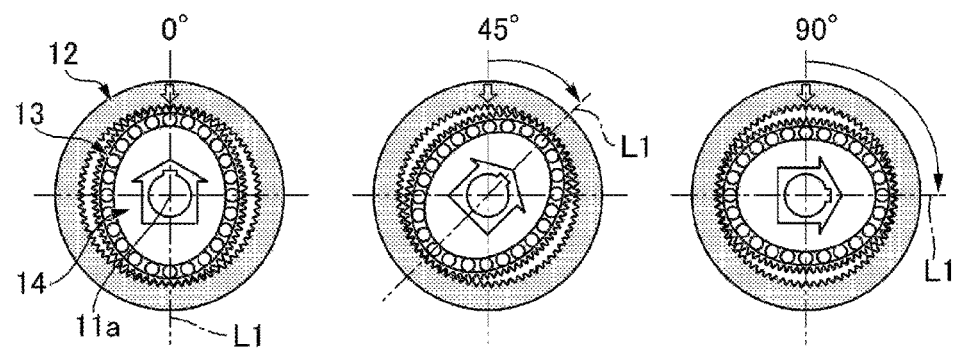

FIGS. 5(A), 5(B), and 5(B11)-5(B13) include explanatory drawings showing meshed states of the internally toothed gear 12 and the externally toothed gear 13 in axially perpendicular cross-sections at different positions in the tooth trace direction. In FIG. 5, (A1) shows different positions in the tooth trace direction, FIG. 5(A2) is a partial enlarged cross-sectional view of the externally toothed gear 13, and FIGS. 5(B11) to 5(B13) show axially perpendicular cross-sections of the externally toothed gear 13 at different positions b11 to b13 in the tooth trace direction.

The external-teeth-forming portion 13d of the externally toothed gear 13 is made to flex into an ellipsoidal shape by the wave generator 14 in the axially perpendicular cross-sections at the positions b11 to b13 in the tooth trace direction A. Specifically, the externally toothed gear is made to flex so that a rim neutral circle of the root of the externally toothed gear 13 is an ellipsoidal curve C1. The externally toothed gear 13 is also made to flex so that the major-diameter positions L of the ellipsoidal curve C1 in the axially perpendicular cross-sections at positions b11 to b13 in the tooth trace direction A gradually change along the tooth trace direction A, around a rotational center axis 11a of the device. The externally toothed gear 13 made to flex in this manner meshes with the internal teeth 12a of the internally toothed gear 12 in the major-diameter positions L1 of the ellipsoidal curve C1 in the axially perpendicular cross-sections at positions b11 to b13 in the tooth trace direction A.

In the illustrated example, the major-diameter positions L1 of the ellipsoidal curve C1 in the axially perpendicular cross-sections at positions b11 to b13 in the tooth trace direction gradually change continuously in the same direction around the rotational center axis 11a (around the center of the ellipsoidal curve C1), from the position b11 of one end in the tooth trace direction A to the position b13 of the other end. The major-diameter positions may also be gradually changed in the same direction in increments, by fixed angles over fixed distances along the tooth trace direction A. The ellipsoidal curve C1 at the position b12 (midway along the tooth trace direction) is rotated 45 degrees clockwise from the ellipsoidal curve C1 of the position b11 of one end in the tooth trace direction A, and the ellipsoidal curve C1 at the position b13 of the other end is rotated 90 degrees clockwise.

At the positions b11 to b13, the external teeth 13e of the externally toothed gear 13 mesh with the internal teeth 12a of the internally toothed gear 12 in the major-diameter positions L1 of the ellipsoidal curve C1 Therefore, the meshing positions of the externally toothed gear 13 with the internally toothed gear 12 continuously move circumferentially in the tooth trace direction from the position b11 of one end in the tooth trace direction. Specifically, as shown by curve 13C in FIG. 6, the individual external teeth 13e along substantially half the circumference mesh simultaneously with the internal teeth 12a when viewed along the tooth trace direction A, although the meshing is only partial for each of the teeth.

In the cup-shaped externally toothed gear 13, the amount of flexure in the cylindrical barrel part 13a increases in the radial direction in accordance with the distance from the side of the diaphragm 13b. Causing the external-teeth-forming portion 13d to flex so that the same ellipsoidal curve C1 is formed in the tooth trace direction A causes unnecessary stress to the external-teeth-forming portion 13d.

In the present example, the external-teeth-forming portion 13*d* of the externally toothed gear 13 is designed so that from the position b13 of the inner-side end toward the position b11 of the other opening-end side in the tooth trace direction A, there is a gradual increase in the length of the major diameter of the ellipsoidal curve C1 in the axially perpendicular cross-sections at different positions in the tooth trace direction A. The externally toothed gear 13 can thereby be made to flex without incurring excessive stress.

In a conventional cup-shaped strain wave gearing, the externally toothed gear 13 is made to flex into the form of an ellipsoidal curve having the same phase throughout the entire tooth trace direction, and there are only two meshing positions with the internally toothed gear 12 in the major-diameter direction. Therefore, in the cup-shaped strain wave gearing of the present example, the meshing areas of the two gears 12, 13 are nearly the same as in conventional practice, but a substantially semicircular grouping of the external teeth 13*e* simultaneously participate in the meshing. Consequently, it is possible to achieve a strain wave gearing in which the meshing rigidity of the two gears 12, 13 is higher and transmitted torque capacity is greater.

At different positions in the tooth trace direction A of the externally toothed gear 13, different portions in the circumferential direction are made to flex radially outward or inward. Therefore, vibrational noise caused by elastic deformation of the externally toothed gear 13 can be more effectively suppressed than in a conventional strain wave gearing which rotates while the same positions in the circumferential direction are made to flex radially outward or inward.

Other Embodiments (1) The above examples refer to instances in which the present invention is applied to a flat strain wave gearing and a cup-shaped strain wave gearing. The present invention can be applied to a top-hat-shaped strain wave gearing in the same manner as the case of a cup-shaped strain wave gearing.

(2) In the above examples, the externally toothed gear is made to flex so that the meshing positions of the two gears move in the same direction circumferentially, along the tooth trace direction. Instead, the externally toothed gear may be made to flex so that from one end toward the other in the tooth trace direction, the major diameter positions of the ellipsoidal curve in the axially perpendicular cross-sections of the different positions in the tooth trace direction gradually change in the opposite circumferential direction from positions midway along the tooth trace direction, after having gradually changed in one circumferential direction.

If this configuration is used, opposite axial thrust acts on the meshing portions, centered about the positions in the middle of the tooth trace direction. Therefore, a thrust bearing can be omitted because the left and right axial thrust forces cancel each other out.

(3) In the above examples, the meshing positions of the flexible externally toothed gear which is flexed into an ellipsoidal shape the major diameter positions of the ellipsoidal curve) gradually change in the circumferential direction through the entire tooth trace direction. For example, the flat strain wave gearing shown in FIG. 1 may be designed so that in the portion of the externally toothed gear 3 that meshes with one internally toothed gear 2S, the meshing position moves in the circumferential direction when viewed along the tooth trace direction, and in the portion of the externally toothed gear 3 that meshes with the other internally toothed gear 2D, the meshing position does not move in the circumferential direction. A possible way to achieve this is for the major diameter positions of the ellipsoidal curve, which defines the external peripheral surface of the side aligned with the internally toothed gear 2S in the ellipsoidal external peripheral surface 5 of the wave generator 4, to be made to change gradually along the axial direction, and for the major diameter positions in the external peripheral surface portion of the side aligned with the internally toothed gear 2D to be in fixed positions in the circumferential direction.

(4) In the above examples, an externally toothed gear is made to flex into an ellipsoidal shape and mesh with an internally toothed gear. In this case, the difference in the number of teeth between the externally toothed gear and the internally toothed gear is set to 2n. Another possibility is to cause the externally toothed gear to flex into a non-circular shape so as to mesh with the internally toothed gear in three locations in the circumferential direction. In this case, the difference in the number of teeth between the two gears is set to 3n.

In this case, in the axially perpendicular cross-sections of the externally toothed gear in the tooth trace direction, the externally toothed gear is made to flex in the radial direction so that the rim neutral circle of the root of the externally toothed gear takes on a non-circular curve, and the externally toothed gear meshes with the internally toothed gear in multiple positions separated in the circumferential direction. In other words, the external peripheral surface shape of the wave generator is appropriately set so that the externally toothed gear can be made to flex in this manner.

The non-circular curve herein is a curve inscribed inside a circle in multiple locations, and the externally toothed gear meshes with the internally toothed gear in the inscribed positions. The externally toothed gear is made to flex so that so that the inscribed positions of the non-circular curve in the axially perpendicular cross-sections of the tooth trace direction change in the circumferential direction, along the tooth trace direction.

(5) The present invention can also be applied to a strain wave gearing having a configuration in which a flexible internally toothed gear is disposed on the external peripheral side of a rigid externally toothed gear, and the internally toothed gear made to flex by a wave generator and caused to mesh with the externally toothed gear.

(6) The present invention can also be similarly applied to the frictional engagement wave devices proposed in Patent Documents 5 and 6.

(7) The present invention can also be similarly applied to a wave generator or the like that uses the piezoelectric element proposed in Patent Document 5.

The invention claimed is:

1. A wave generator of a strain wave gearing or a frictional engagement wave device comprising:
    an ellipsoidal peripheral surface for causing a flexible member into an ellipsoidal shape, in which the flexible member is an externally toothed gear or a flexible internally toothed gear in the strain wave gearing, or the flexible member is a flexible member having a frictional engagement external peripheral surface or a frictional engagement internal peripheral surface in the frictional engagement wave device;
    the ellipsoidal peripheral surface being defined by an ellipsoidal curve in which a profile shape, seen when the ellipsoidal peripheral surface is sectioned by a plane orthogonal to a center axis at different positions in a direction of a center axis, is centered about the center axis; the ellipsoidal peripheral surface having a peripheral surface portion of at least a predetermined width in a direction of the center axis; and major-diameter positions of the ellipsoidal curve in the peripheral surface portion gradually changing about the center axis along the direction of the center axis;

the wave generator further comprising:

a rigid wave generator plug having the ellipsoidal peripheral surface; and a wave generator rolling bearing fitted in an external peripheral surface or an internal peripheral surface of the wave generator plug;

the wave generator rolling bearing having a flexible outer race and a flexible inner race; and the outer race or the inner race of the wave generator rolling bearing being made to flex into an ellipsoidal shape by the ellipsoidal peripheral surface.

2. The wave generator according to claim 1, wherein the major-diameter positions of the ellipsoidal curve in the peripheral surface portion change within an angular range of 180 degrees or less about the center axis, between one end to the other in the direction of the center axis of the peripheral surface portion.

3. The wave generator according to claim 1, wherein the major-diameter positions of the ellipsoidal curve in the peripheral surface portion, gradually change in a first direction about the center axis and then gradually change in a direction opposite to the first direction about the center axis along the direction of the center axis.

4. The wave generator according to claim 3, wherein the major-diameter positions of the ellipsoidal curve in the peripheral surface portion are in the same rotational positions at one end and the other end of the direction of the center axis in the peripheral surface portion; and in a middle position between the both ends, the major-diameter positions are rotated by angles of 90 degrees or less from the rotational positions.

5. The wave generator according to claim 1, wherein the major-diameter dimension of the ellipsoidal curve gradually decreases from one end toward the other of the ellipsoidal peripheral surface, along the direction of the center axis.

6. The wave generator according to claim 1, wherein the wave generator is for the strain wave gearing.

7. The wave generator according to claim 1, wherein the flexible member is an externally toothed gear or a flexible internally toothed gear in the strain wave gearing.

8. The wave generator according to claim 1, wherein the outer race of the wave generator rolling bearing being made to flex into an ellipsoidal shape by the ellipsoidal peripheral surface.

9. The wave generator according to claim 1, wherein the inner race of the wave generator rolling bearing being made to flex into an ellipsoidal shape by the ellipsoidal peripheral surface.

* * * * *